(12) United States Patent
Zhu

(10) Patent No.: US 12,092,290 B2
(45) Date of Patent: Sep. 17, 2024

(54) LAMP WALL SEAT WITH DOOR PANEL AND WATERPROOF SOCKET AND WALL LAMP

(71) Applicant: Zhongshan weihua lighting technology co., ltd., Zhongshan (CN)

(72) Inventor: Xiaohua Zhu, Zhongshan (CN)

( * ) Notice: Subject to any disclaimer, the term of this patent is extended or adjusted under 35 U.S.C. 154(b) by 237 days.

(21) Appl. No.: 17/856,224

(22) Filed: Jul. 1, 2022

(65) Prior Publication Data

US 2023/0280008 A1 Sep. 7, 2023

(30) Foreign Application Priority Data

Mar. 3, 2022 (CN) .......................... 202220468851.9

(51) Int. Cl.
| | |
|---|---|
| *F21S 8/00* | (2006.01) |
| *F21V 21/02* | (2006.01) |
| *F21V 33/00* | (2006.01) |
| *H01R 13/453* | (2006.01) |
| *H01R 13/52* | (2006.01) |
| *H01R 24/76* | (2011.01) |
| *H01R 24/78* | (2011.01) |
| *H02G 3/08* | (2006.01) |
| *H02G 3/14* | (2006.01) |
| *H02G 3/20* | (2006.01) |

(52) U.S. Cl.
CPC .............. *F21S 8/036* (2013.01); *F21V 21/02* (2013.01); *H01R 24/76* (2013.01); *H02G 3/08* (2013.01); *H02G 3/14* (2013.01)

(58) Field of Classification Search
CPC ........... F21S 8/036; F21S 8/033; F21V 21/02; F21V 33/00; H01R 24/76; H01R 24/78; H01R 13/4534; H01R 13/5213; H02G 3/08; H02G 3/14; H02G 3/20
See application file for complete search history.

(56) References Cited

U.S. PATENT DOCUMENTS

| | | | | |
|---|---|---|---|---|
| 7,374,317 B2 * | 5/2008 | Prazoff | .................... | F21V 23/00 174/67 |
| 2019/0109427 A1 * | 4/2019 | Chavez | ............... | F21V 23/0464 |

* cited by examiner

*Primary Examiner* — Hoa C Nguyen
*Assistant Examiner* — Amol H Patel

(57) ABSTRACT

A lamp wall seat and a wall lamp with a door panel and a waterproof socket, and the lamp wall seat and the wall lamp with the door panel and the waterproof socket includes a box body, a socket and a door panel, one side of the box body is provided with a first through frame, the socket is installed in the box body, a jack end of the socket corresponds to the first through frame, and the door panel is movably arranged between the socket and the first through frame up and down; when the door panel is moved up, the jack end of the socket is exposed, and when the door panel is reset, the jack end of the socket is covered.

16 Claims, 7 Drawing Sheets

LAMP WALL SEAT WITH DOOR PANEL AND WATERPROOF SOCKET AND WALL LAMP

CROSS REFERENCE TO RELATED APPLICATION

This application claims priority benefit of Chinese Invention Application No. 202220468851.9, filed on Mar. 3, 2022, and the entire contents of which are incorporated herein by reference.

TECHNICAL FIELD

The present disclosure relates to a technical field of wall lamps, in particular to a lamp wall seat with a door panel and a waterproof socket, and also relates to a wall lamp.

BACKGROUND ART

Wall lamps are mostly installed on both sides of the entrance door, balconies, stairs, corridors and bedrooms, suitable for long-term lighting. The light is elegant and harmonious, which can decorate the environment gracefully and richly, and is favored by the public.

The existing wall lamp only has lighting function, which has certain limitations in use. How to realize the multi-function of wall lamp and meet the diversified use needs of users has become a problem that needs to be solved.

SUMMARY

In order to overcome the existing technical defects, the present disclosure aims to provide a lamp wall seat and a wall lamp with a door panel and a waterproof socket to solve the above technical problems.

The technical scheme adopted by the present disclosure to solve the technical problems is as follows:

According to one aspect of the present disclosure, a lamp wall seat with the door panel and the waterproof socket is designed, which includes a box body, a socket and a door panel, one side of the box body is provided with a first through frame, the socket is installed in the box body, a jack end of the socket corresponds to the first through frame, and the door panel is movably arranged between the socket and the first through frame; when the door panel is moved up, the jack end of the socket is exposed, and when the door panel is reset, the jack end of the socket is covered.

Adopting the above technical scheme, the wall seat is used to cooperate with the lamp body to form a wall lamp. By setting the socket in the box body of the wall seat, when the wall seat is installed outdoors, if lanterns, decorative light strings, light strips need to be hung near the wall seat, or monitoring equipment need to be powered, the power supply can be realized through the socket without additional wiring, so as to meet the multi-functional use needs and improve the practicability of the wall lamp. By setting the door panel, rainwater can be prevented from entering the socket, which plays a waterproof role and improves the safety performance.

In order to better solve the above-mentioned technical defects, the present disclosure also has a better technical scheme:

In some embodiments, a front side of the door panel is provided with a push plate, an mounting frame is fixedly connected to the box body, the mounting frame is provided with a second through frame corresponding to the first through frame, and the socket is installed on the mounting frame and the jack end of the socket extends into the second through frame, a rear side of the door panel is provided with a connecting block, the connecting block is provided with a through hole, a front side of the mounting frame is connected to a first screw, the first screw is movably matched with the through hole.

In some embodiments, the rear side of the door panel is provided with a guide plate, the front side of the mounting frame is provided with a step groove with a vertical structure, and the guide plate is slidably matched with the step groove. Thereby, the door panel is ensured to move up and down smoothly.

In some embodiments, a spring is sleeved on the first screw, and a lower end of the spring is elastically butted with the connecting block, and when the door panel is moved up, the door panel is reset under an elastic force of the spring to cover the jack end of the socket.

In some embodiments, a waterproof rubber ring is arranged between the front side of the mounting frame and an inner side of the box body. Thereby, the waterproof performance can be further improved.

In some embodiments, the socket is a waterproof two-three-hole socket with a switch.

In some embodiments, the socket is provided with a USB power supply jack.

In some embodiments, a right side of the box body is provided with a mounting plate, the mounting plate is provided with a connecting hole and a mounting hole, the connecting hole is perforated with a second screw, and one end of the second screw is connected with a nut through a through hole on the box body. Thereby, it is convenient to fix the mounting plate on the wall through the mounting hole, and to facilitate the installation of the box body.

In some embodiments, an inner wall of the box body is provided with two sliding grooves with a vertical structure, and left and right ends of the door panel are correspondingly slidably matched with the two sliding grooves; when the door panel is moved up, the door panel is reset under gravity therefor to cover the jack end of the socket.

According to another aspect of the present disclosure, a wall lamp is designed, which includes: a lamp body, a hollow tooth tube and the above-mentioned lamp wall seat, one end of the hollow tooth tube is connected to the lamp body, and the other end is connected to the lamp wall seat.

The wall lamp realizes the multi-functional integration of lamps and sockets, with good practicability, less visible screws, beautiful appearance, and waterproof, and it is suitable for wall lamps of various shapes.

REFERENCE MARKS 1. box body; 101. first through frame; 102. waterproof rubber ring; 2. socket; 3. door panel; 30. push plate; 31. connecting block; 32. guide plate; 4. mounting frame; 40. second through frame; 41. step groove; 5. first screw; 6. spring; 7. mounting plate; 8. second screw; 9. nut; 10. lamp body; 11. hollow tooth tube.

DETAILED DESCRIPTION OF THE EMBODIMENTS

In order to make the purpose, technical scheme and advantages of the present disclosure more clear, the present disclosure is further described in detail in combination with the specific implementation mode and with reference to the attached drawings. It should be understood that these descriptions are only illustrative and are not intended to limit the scope of the present disclosure. In addition, in the following description, the description of the well-known structure and technology is omitted to avoid unnecessary confusion of the concept of the present disclosure.

Embodiment 1

Figure 1:
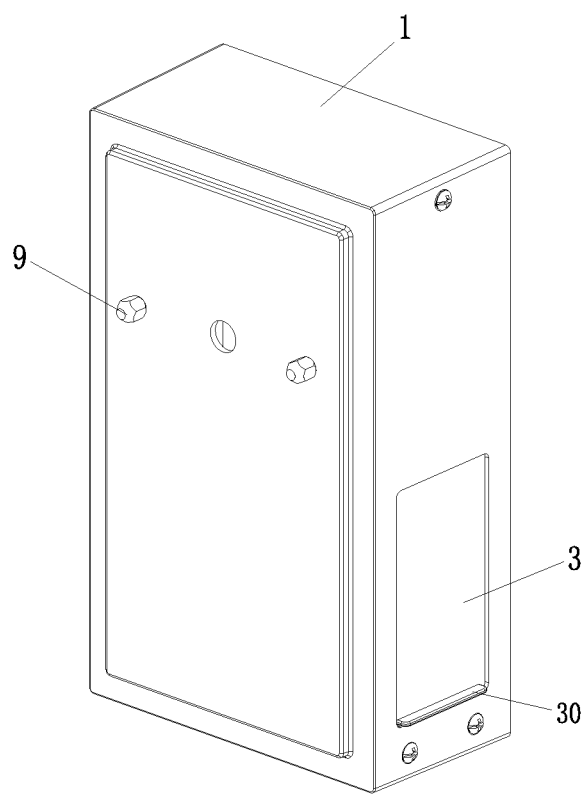
FIG. 1 is a structural diagram of a lamp wall seat with a door panel and a waterproof socket according to an embodiment provided by the present disclosure.
Figure 2:
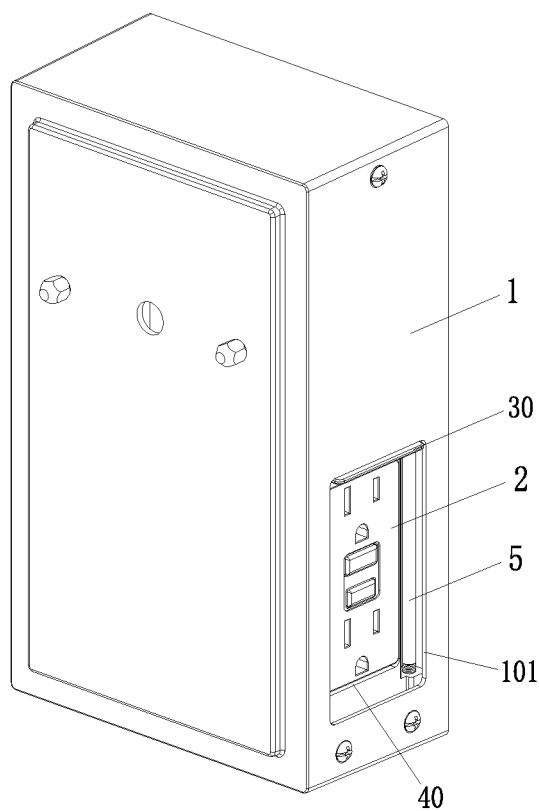
FIG. 2 is a structural diagram of the lamp wall base with the door panel and the waterproof socket, wherein the door panel is in a upward state.
Figure 3:
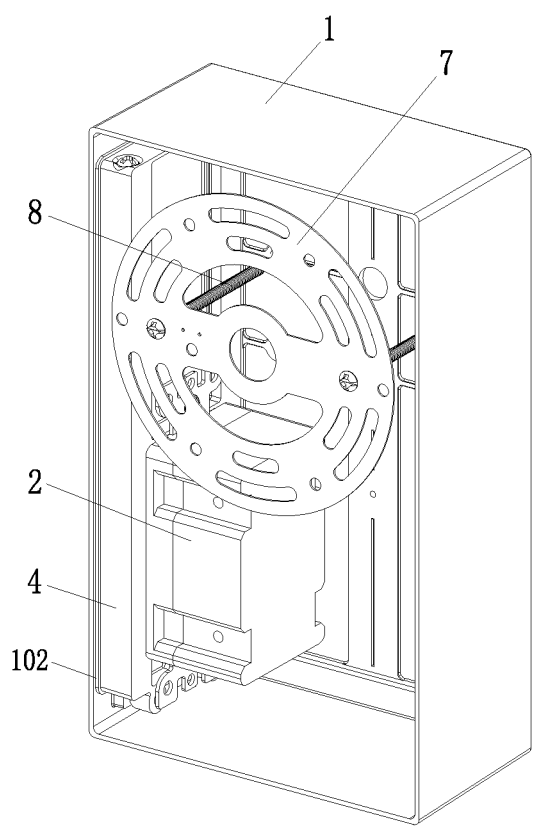
FIG. 3 is a structural diagram of another view of the lamp wall seat with the door panel and the waterproof socket.
Figure 4:
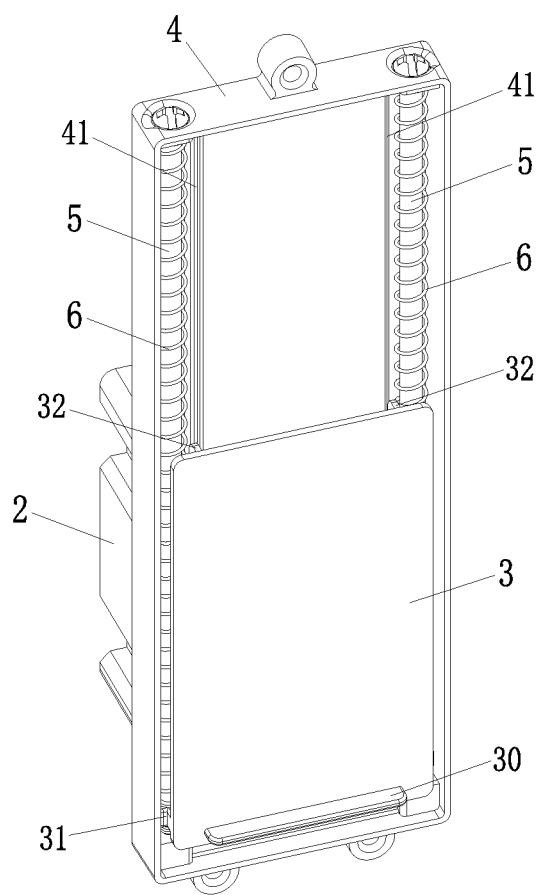
FIG. 4 is a structural diagram of a mounting frame of the lamp wall seat with the door panel and the waterproof socket.
Figure 5:
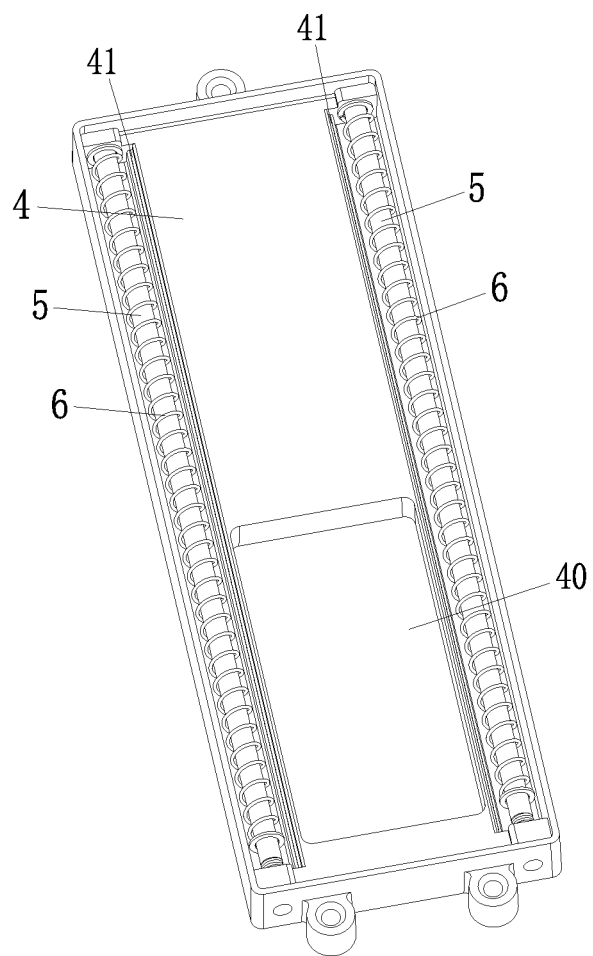
FIG. 5 is a structural diagram of the door panel of the lamp wall seat with the door panel and the waterproof socket.
Figure 6:
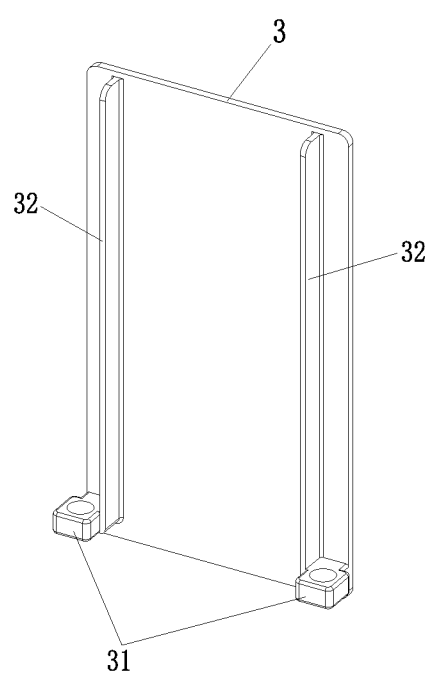
FIG. 6 is a schematic diagram of the connecting structure between the socket, door panel and mounting frame of the lamp wall seat with the door panel and the waterproof socket.

Referring to FIGS. 1 to 6, the present disclosure provides a lamp wall seat with a door panel and a waterproof socket, which includes a box body 1, a socket 2 and a door panel 3. A right side of the box body 1 is provided with a first through frame 101, the socket 2 is installed in the box body 1, and a jack end of the socket 2 corresponds to the first through frame 101. The door panel 3 is movably arranged between the socket 2 and the first through frame 101 up and down. Further, the box body 1 is fixedly connected to a mounting frame 4, the mounting frame 4 is provided with a second through frame 40, and the second through frame 40 is set corresponding to the first through frame 101. The length and width of the second through frame 40 are less than the length and width of the first through frame 101. The socket 2 is installed on the mounting frame 4 and the jack end of the socket 2 extends into the second through frame 40. A front side of the door panel 3 is provided with a push plate 30, a rear side of the door panel 3 is provided with a connecting block 31. The connecting block 31 is provided with a through hole. A groove in the front side of the mounting frame 4 is connected with a first screw 5, and the first screw 5 is movably matched with the through hole on the connecting block 31. The first screw 5 is sleeved with a spring 6, an upper end of the spring 6 is elastically butted with the mounting frame 4, and a lower end of the spring 6 is elastically butted with the connecting block 31.

The rear side of the door panel 3 is provided with a guide plate 32, the front side of the mounting frame 4 is provided with a step groove 41 with a vertical structure, and the guide plate 32 is slidably matched with the step groove 41.

A waterproof rubber ring 102 is arranged between the front side of the mounting frame 4 and an inner side of the box body 1.

The socket 2 is a waterproof two-three-hole socket 2, and the socket 2 is provided with a switch.

The right side of the box body 1 is provided with a mounting plate 7, and the mounting plate 7 is provided with a connecting hole and a mounting hole. The connecting hole is provided with a second screw 8, and one end of the second screw 8 is threaded with a nut 9 through the through hole on the box body 1.

When the push plate 30 is pushed to drive the door panel 3 to move up, the jack end of the socket 2 can be exposed. When the push plate 30 is released, the door panel 3 will reset under the elastic force of the spring 6 to cover the jack end of the socket 2.

In some embodiments, the socket 2 is provided with a USB jack.

Embodiment 2

The present disclosure provides another lamp wall seat with a door panel and a waterproof socket. The difference between the embodiment and the embodiment 1 is that the box body is not fixedly connected to a mounting frame, the inner wall of the box body is provided with two vertical sliding grooves, and the left and right ends of the door panel are correspondingly matched with the two sliding grooves. When the door panel is moved up, the door panel can be reset under its own gravity to cover the jack end of the socket.

Embodiment 3

Figure 7:
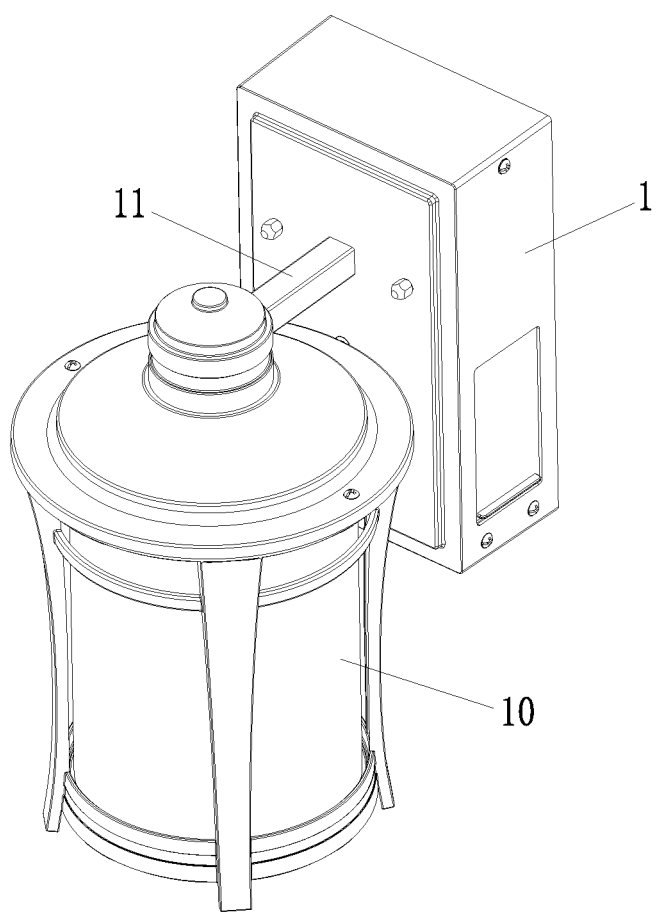
FIG. 7 is a structural diagram of a wall lamp according to an embodiment provided by the present disclosure.

As shown in FIG. 1 to FIG. 7, a wall lamp provided by the present disclosure includes a lamp body 10, a hollow tooth tube 11 and a lamp wall seat in embodiment 1 or embodiment 2. One end of the hollow tooth tube 11 is connected to the lamp body 10, and the other end is connected to the box body 1 on the lamp wall seat. Specifically, the other end of the hollow tooth tube 11 penetrates into the inside of the box body 1 and is threadedly connected with the lock nut. The hollow tooth tube 11 has a hollow structure inside, which is used to pass a wire from the inside thereof.

The above is only some embodiments of the present disclosure. For ordinary technicians in the art, they can also make a number of modifications and improvements without departing from the creative idea of the present disclosure, which belong to the protection scope of the present disclosure.

What is claimed is:

1. A lamp wall seat with a door panel and a waterproof socket, comprising:
   a box body,
   a socket and
   a door panel, wherein one side of the box body is provided with a first through frame, the socket is installed in the box body, a jack end of the socket corresponds to the first through frame, and the door panel is movably arranged between the socket and the first through frame up and down; when the door panel is moved up, the jack end of the socket is exposed, and when the door panel is reset, the jack end of the socket is covered;
   wherein a front side of the door panel is provided with a push plate, a mounting frame is fixedly connected to the box body, the mounting frame is provided with a second through frame corresponding to the first through frame, and the socket is installed on the mounting frame and the jack end of the socket extends into the second through frame, a rear side of the door panel is provided with a connecting block, the connecting block is provided with a through hole, a front side of the mounting frame is connected to a first screw, the first screw is movably matched with the through hole.

2. The lamp wall seat with the door panel and the waterproof socket according to claim 1, wherein the rear side of the door panel is provided with a guide plate, the front side of the mounting frame is provided with a step groove with a vertical structure, and the guide plate is slidably matched with the step groove.

3. The lamp wall seat with the door panel and the waterproof socket according to claim 1, wherein a spring is sleeved on the first screw, and a lower end of the spring is elastically butted with the connecting block, and when the door panel is moved up, the door panel is reset under an elastic force of the spring to cover the jack end of the socket.

4. The lamp wall seat with the door panel and the waterproof socket according to claim 1, wherein a waterproof rubber ring is arranged between the front side of the mounting frame and an inner side of the box body.

5. The lamp wall seat with the door panel and the waterproof socket according to claim 1, wherein the socket is a waterproof two-three-hole socket with a switch.

6. The lamp wall seat with the door panel and the waterproof socket according to claim 5, wherein the socket is provided with a USB power supply jack.

7. The lamp wall seat with the door panel and the waterproof socket-according to claim 1, wherein a right side of the box body is provided with a mounting plate, the mounting plate is provided with a connecting hole and a mounting hole, the connecting hole is perforated with a second screw, and one end of the second screw is connected with a nut through a through hole on the box body.

8. A wall lamp, comprising a lamp body, a hollow tooth tube and a lamp wall seat according to claim 1, one end of the hollow tooth tube is connected to the lamp body, and an other end of the hollow tooth tube is connected to the lamp wall seat.

9. A lamp wall seat with the door panel and the waterproof socket, comprising:
  a box body,
  a socket and
  a door panel, wherein one side of the box body is provided with a first through frame, the socket is installed in the box body, a jack end of the socket corresponds to the first through frame, and the door panel is movably arranged between the socket and the first through frame up and down; when the door panel is moved up, the jack end of the socket is exposed, and when the door panel is reset, the jack end of the socket is covered;
  wherein an inner wall of the box body is provided with two sliding grooves with a vertical structure, and left and right ends of the door panel are correspondingly slidably matched with the two sliding grooves; when the door panel is moved up, the door panel is reset under gravity therefor to cover the jack end of the socket.

10. The wall lamp according to claim 8, wherein the rear side of the door panel is provided with a guide plate, the front side of the mounting frame is provided with a step groove with a vertical structure, and the guide plate is slidably matched with the step groove.

11. The wall lamp according to claim 8, wherein a spring is sleeved on the first screw, and a lower end of the spring is elastically butted with the connecting block, and when the door panel is moved up, the door panel is reset under an elastic force of the spring to cover the jack end of the socket.

12. The wall lamp according to claim 8, wherein a waterproof rubber ring is arranged between the front side of the mounting frame and an inner side of the box body.

13. The wall lamp according to claim 8, wherein the socket is a waterproof two-three-hole socket with a switch.

14. The wall lamp according to claim 13, wherein the socket is provided with a USB power supply jack.

15. The wall lamp according to claim 8, wherein a right side of the box body is provided with a mounting plate, the mounting plate is provided with a connecting hole and a mounting hole, the connecting hole is perforated with a second screw, and one end of the second screw is connected with a nut through a through hole on the box body.

16. The wall lamp according to claim 8, wherein an inner wall of the box body is provided with two sliding grooves with a vertical structure, and left and right ends of the door panel are correspondingly slidably matched with the two sliding grooves; when the door panel is moved up, the door panel is reset under gravity therefor to cover the jack end of the socket.

* * * * *